US009971768B2

(12) United States Patent
Murthy et al.

(10) Patent No.: US 9,971,768 B2
(45) Date of Patent: May 15, 2018

(54) IMAGE CAPTURE SYSTEM FOR A VEHICLE USING TRANSLATION OF DIFFERENT LANGUAGES

(71) Applicant: Jaguar Land Rover Limited, Coventry (GB)

(72) Inventors: Niranjan Murthy, Coventry (GB); Andy Wells, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days. days.

(21) Appl. No.: 15/114,663

(22) PCT Filed: Feb. 19, 2015

(86) PCT No.: PCT/EP2015/053540
§ 371 (c)(1),
(2) Date: Jul. 27, 2016

(87) PCT Pub. No.: WO2015/124695
PCT Pub. Date: Aug. 27, 2015

(65) Prior Publication Data
US 2016/0350286 A1 Dec. 1, 2016

(30) Foreign Application Priority Data
Feb. 21, 2014 (GB) .................................. 1403068.8

(51) Int. Cl.
*G10L 15/00* (2013.01)
*G10L 15/04* (2013.01)
(Continued)

(52) U.S. Cl.
CPC ....... *G06F 17/289* (2013.01); *G01C 21/3602* (2013.01); *G01C 21/3629* (2013.01);
(Continued)

(58) Field of Classification Search
CPC ......... G10L 15/00; G10L 15/18; G10L 15/28; G10L 15/04; G10L 15/14; G10L 15/06;
(Continued)

(56) References Cited

U.S. PATENT DOCUMENTS 5,450,057 A * 9/1995 Watanabe ................ B60Q 9/00
180/169
5,754,660 A * 5/1998 Shimizu .................. A63F 13/02
381/17
(Continued)

FOREIGN PATENT DOCUMENTS

DE 10 2012 014 484 A1 1/2013
EP 1 359 557 A1 11/2003
(Continued)

OTHER PUBLICATIONS

Combined Search and Examination Report, GB Application No. 1403068.8, dated Aug. 20, 2014, 7 pages.
(Continued)

*Primary Examiner* — Anne L Thomas-Homescu
(74) *Attorney, Agent, or Firm* — Myers Bigel, P.A.

(57) ABSTRACT

A system for use in a vehicle having a selected vehicle language, the system comprising image capture means for capturing an image scene external to the vehicle, wherein the image scene includes one or more information indicator including text in a country language other than the selected vehicle language. A means is provided for outputting a vehicle language signal representative of the selected vehicle language to an off-board server; and a means is provided for outputting a country language signal to the off-board server which is representative of the country language. A means is also provided for outputting the text to the off-board server for translation from the country language into the vehicle language; together with means for receiving a translated text output from the off-board server
(Continued)

which is representative of the translated text. A means is provided for communicating the translated text output to the vehicle user. In an alternative arrangement the system carries a translator on-board the vehicle for translation of the text from the country language into the vehicle language, so that translation occurs on-board the vehicle and not off-board the vehicle.

16 Claims, 5 Drawing Sheets

(51) Int. Cl.
| | |
|---|---|
| *G10L 15/28* | (2013.01) |
| *G10L 15/06* | (2013.01) |
| *G10L 15/26* | (2006.01) |
| *G10L 15/14* | (2006.01) |
| *G10L 15/20* | (2006.01) |
| *G10L 21/00* | (2013.01) |
| *G10L 25/00* | (2013.01) |
| *G06K 9/00* | (2006.01) |
| *G06K 9/34* | (2006.01) |
| *G06K 9/46* | (2006.01) |
| *H04N 7/18* | (2006.01) |
| *G06F 17/28* | (2006.01) |
| *G01C 21/36* | (2006.01) |
| *G06K 9/32* | (2006.01) |
| *G08G 1/0962* | (2006.01) |
| *G08G 1/0967* | (2006.01) |
| *G10L 13/04* | (2013.01) |

(52) U.S. Cl.
CPC ......... *G06K 9/00818* (2013.01); *G06K 9/325* (2013.01); *G06K 9/3258* (2013.01); *G08G 1/09623* (2013.01); *G08G 1/096716* (2013.01); *G08G 1/096758* (2013.01); *G08G 1/096775* (2013.01); *G10L 13/043* (2013.01)

(58) Field of Classification Search
CPC ......... G10L 15/20; G10L 15/26; G10L 17/00; G06K 9/00; G06F 17/28; G06F 17/27
See application file for complete search history.

(56) References Cited

U.S. PATENT DOCUMENTS

| | | | | | |
|---|---|---|---|---|---|
| 5,937,384 | A * | 8/1999 | Huang | ................ | G06K 9/6297 704/251 |
| 6,668,243 | B1 * | 12/2003 | Odell | ................ | G10L 15/08 704/242 |
| 7,720,683 | B1 * | 5/2010 | Vermeulen | ................ | G10L 15/22 704/235 |
| 8,493,198 | B1 * | 7/2013 | Vasquez | ................ | B60Q 9/008 340/425.5 |
| 9,449,598 | B1 * | 9/2016 | Rastrow | ................ | G10L 15/32 |
| 9,620,108 | B2 * | 4/2017 | Sak | ................ | G10L 15/08 |
| 9,643,605 | B2 * | 5/2017 | Pawlicki | ................ | B60T 7/22 |
| 9,690,782 | B2 * | 6/2017 | Vukosavljevic | ...... | G06F 17/289 |
| 2002/0135618 | A1 * | 9/2002 | Maes | ................ | G06F 3/0481 715/767 |
| 2003/0059088 | A1 * | 3/2003 | Culp | ................ | G06K 9/2054 382/104 |
| 2003/0202683 | A1 * | 10/2003 | Ma | ................ | G08G 1/096716 382/104 |
| 2004/0016870 | A1 * | 1/2004 | Pawlicki | ............ | B60K 31/0008 250/208.1 |
| 2004/0093220 | A1 * | 5/2004 | Kirby | ................ | G06F 17/27 704/278 |
| 2005/0010412 | A1 * | 1/2005 | Aronowitz | ............ | G10L 15/02 704/254 |
| 2005/0086051 | A1 * | 4/2005 | Brulle-Drews | .... | G01C 21/3602 704/7 |
| 2005/0102139 | A1 * | 5/2005 | Fukada | ............ | G06F 17/30253 704/235 |
| 2006/0089792 | A1 * | 4/2006 | Manber | ............ | G01C 21/3644 701/408 |
| 2006/0125919 | A1 * | 6/2006 | Camilleri | ................ | B60R 1/00 348/148 |
| 2006/0178886 | A1 * | 8/2006 | Braho | ................ | G10L 15/065 704/246 |
| 2007/0192104 | A1 * | 8/2007 | Blewett | ................ | G10L 15/28 704/256 |
| 2007/0299666 | A1 * | 12/2007 | Li | ................ | G10L 15/005 704/236 |
| 2008/0065380 | A1 * | 3/2008 | Kwak | ................ | G10L 17/04 704/243 |
| 2008/0084473 | A1 * | 4/2008 | Romanowich | ... | G08B 13/19671 348/135 |
| 2008/0114595 | A1 * | 5/2008 | Vair | ................ | G10L 15/08 704/236 |
| 2008/0201147 | A1 * | 8/2008 | Han | ................ | G10L 15/30 704/254 |
| 2008/0221862 | A1 * | 9/2008 | Guo | ................ | G06F 17/289 704/2 |
| 2008/0243473 | A1 * | 10/2008 | Boyd | ................ | G06F 17/28 704/2 |
| 2008/0273796 | A1 * | 11/2008 | Kansal | ................ | G06K 9/325 382/176 |
| 2009/0285445 | A1 * | 11/2009 | Vasa | ................ | G01C 21/26 382/100 |
| 2010/0169090 | A1 * | 7/2010 | Cui | ................ | G10L 15/20 704/233 |
| 2011/0054883 | A1 * | 3/2011 | Yun | ................ | G06F 17/2755 704/9 |
| 2011/0131046 | A1 * | 6/2011 | Zweig | ................ | G10L 15/02 704/251 |
| 2011/0166855 | A1 * | 7/2011 | Vermeulen | ............ | G10L 15/32 704/231 |
| 2011/0301953 | A1 * | 12/2011 | Lee | ................ | G10L 15/187 704/243 |
| 2012/0041764 | A1 * | 2/2012 | Xu | ................ | G10L 15/065 704/256.1 |
| 2012/0062743 | A1 * | 3/2012 | Lynam | ................ | B60Q 9/005 348/148 |
| 2012/0109650 | A1 * | 5/2012 | Cho | ................ | G10L 15/144 704/238 |
| 2012/0166183 | A1 * | 6/2012 | Suendermann | ... | G06F 17/30654 704/9 |
| 2013/0076883 | A1 * | 3/2013 | Madau | ................ | B60K 35/00 348/78 |
| 2013/0155241 | A1 * | 6/2013 | Tanuki | ................ | B60R 1/00 348/148 |
| 2013/0286193 | A1 * | 10/2013 | Pflug | ................ | B60R 1/00 348/135 |
| 2013/0325473 | A1 * | 12/2013 | Larcher | ................ | G10L 17/10 704/249 |
| 2013/0343608 | A1 * | 12/2013 | Bar | ................ | G01C 21/3602 382/103 |
| 2014/0062852 | A1 * | 3/2014 | Naveh | ................ | G06F 3/0304 345/156 |
| 2014/0129224 | A1 * | 5/2014 | Chien | ................ | G10L 15/142 704/249 |
| 2014/0172408 | A1 * | 6/2014 | Vukosavljevic | ...... | G06F 17/211 704/2 |
| 2014/0222289 | A1 * | 8/2014 | Fujishiro | ................ | B60T 7/22 701/41 |
| 2014/0309864 | A1 * | 10/2014 | Ricci | ................ | H04W 48/04 701/36 |
| 2015/0006175 | A1 * | 1/2015 | Park | ................ | G10L 15/18 704/245 |
| 2015/0095032 | A1 * | 4/2015 | Li | ................ | G10L 15/083 704/255 |
| 2015/0161991 | A1 * | 6/2015 | Sak | ................ | G10L 15/08 704/254 |
| 2015/0217691 | A1 * | 8/2015 | Tanuki | ................ | E02F 9/261 348/148 |

(56) References Cited

U.S. PATENT DOCUMENTS

| | | | | |
|---|---|---|---|---|
| 2015/0232065 | A1* | 8/2015 | Ricci | B60R 25/01 |
| | | | | 701/36 |
| 2015/0234812 | A1* | 8/2015 | Vukosavljevic | G06F 17/289 |
| | | | | 704/2 |
| 2015/0284001 | A1* | 10/2015 | Watanabe | H04N 7/18 |
| | | | | 701/36 |
| 2015/0336578 | A1* | 11/2015 | Lord | B60T 17/22 |
| | | | | 701/2 |
| 2016/0080883 | A1* | 5/2016 | Yamamoto | H04S 5/005 |
| 2016/0134986 | A1* | 5/2016 | Liu | H04R 1/403 |
| | | | | 381/303 |
| 2017/0186239 | A1* | 6/2017 | Hanai | G06T 19/006 |
| 2017/0372612 | A1* | 12/2017 | Bai | G08G 1/161 |

FOREIGN PATENT DOCUMENTS

| | | |
|---|---|---|
| EP | 1 507 129 A1 | 2/2005 |
| JP | 7-159190 A | 6/1995 |
| JP | 2006-79356 A | 3/2006 |
| WO | WO 2008/114104 A1 | 9/2008 |

OTHER PUBLICATIONS

Notification of Transmittal of the International Search Report and the Written Opinion of the International Searching Authority, or the Declaration, PCT/EP2015/053540, dated May 20, 2015, 10 pages.
First Office Action with English language Office Action Summary, Japanese Patent Application No. 2016-553019, dated Oct. 3, 2017, 8 pp.

* cited by examiner

IMAGE CAPTURE SYSTEM FOR A VEHICLE USING TRANSLATION OF DIFFERENT LANGUAGES

RELATED APPLICATIONS

This application is a 35 U.S.C. § 371 national stage application of PCT Application No. PCT/EP2015/053540, filed on Feb. 19, 2015, which claims priority from Great Britain Patent Application No. 1403068.8 filed on Feb. 21, 2014, the contents of which are incorporated herein by reference in their entireties. The above-reference PCT International Application was published in the English language as International Publication No. WO 2015/124695 A1 on Aug. 27, 2015.

FIELD OF THE INVENTION

The present disclosure relates to a system for use in a vehicle, and in particular, but not exclusively, in a vehicle intended to be driven in a plurality of different countries where different languages are spoken. The present disclosure also relates to a vehicle incorporating such a vehicle system and to a method of aiding driving of a vehicle in a plurality of different countries. Aspects of the invention relate to a system, to a method and to a vehicle.

BACKGROUND

Satellite navigation systems in vehicles have the facility to provide spoken instruction to the driver in a language of choice, so that a navigation route, as selected by the user, can be easily understood and followed. However, where vehicles are driven across different countries or territories in which different languages are spoken, a problem exists for the vehicle driver in that they may not understand the language of the road signs or other information displays that are present on the route. For example, when driving across Europe, a vehicle driver may have to drive through several different countries, each having a different language and none of which may be familiar to the vehicle driver or passengers. This can make the driving experience stressful for the driver, and potentially dangerous, if important road traffic information is conveyed via signage on the side of the road. Whilst dictionaries are available for a driver to look-up words in a language they are not familiar with, this process is incompatible with the act of driving a vehicle, and so requires a journey to be interrupted for the driver to look-up a translation.

It is against this background that the present invention has been conceived. Embodiments of the invention may provide a method or a system that aids driver road use in a plurality of different geographical regions. Other aims and advantages of the invention will become apparent from the following description, claims and drawings.

SUMMARY OF THE INVENTION

Aspects of the invention provide a system, a method and a vehicle as claimed in the appended claims.

According to one aspect of the present invention, there is provided a system for use in a vehicle having a selected vehicle language in which communications are to be carried out between a vehicle user and the system, the system comprising image capture means for capturing an image scene external to the vehicle, wherein the image scene includes one or more information indicator including text in a country language other than the selected vehicle language; means for outputting a vehicle language signal representative of the selected vehicle language to an off-board server; means for outputting a country language signal to the off-board server which is representative of the country language; means for outputting the text to the off-board server for translation from the country language into the vehicle language; means for receiving a translated text output from the off-board server which is representative of the translated text; and means for communicating the translated text output to the vehicle user.

In another aspect, there is provided a system for use in a vehicle having a selected vehicle language in which communications are to be carried out between a vehicle user and the system, the system comprising image capture means for capturing an image scene external to the vehicle, wherein the image scene includes one or more information indicator including text in a country language other than the selected vehicle language; means for translating the text from the country language into the selected vehicle language and for generating a translated text output representative of the translated text; and means for communicating the translated text output to the vehicle user.

For the purpose of this specification, the phrase "information indicator" is intended to refer to any character in the form of a numeric or alphabetic character or other symbol which is of the type typically carried on signage, electronic or other display boards, advertisement boards or any other hoarding to convey meaning or instruction to a vehicle user whilst travelling in a vehicle and includes, for example, characters in the form of road names and numbers, directional information, road exit or junction numbers, distances, road sign symbols, and place names.

The information output may be communicated to the user visually or audibly, or both. The communication means may be selectable by the user as a preference via, for example, a human machine interface (HMI).

The system aids driver road use by providing the driver with the facility to view road sign information which may have been in an unfamiliar language, or which he may have missed when viewing the sign directly, by capturing image data using the camera system and communicating to the driver a translation of the text, which is derived from the image data, in a familiar language.

It may be beneficial for the translation process to be performed off-board or externally to the vehicle computer system so as to reduce the processor power and the data memory that is required for the on-board computer.

This embodiment provides the advantage that the translation software need not be stored on the vehicle itself, but is stored on the off-board server. This reduces the processing requirements of the on-board vehicle computer.

However, if translation is carried out on-board the vehicle, this is advantageous in circumstances in which there is a wireless 'black spot' or communication between the vehicle and an external server system is relatively weak, as the user can still be presented with a translation of the imaged text via an on-board translation processor.

The information indicator may also include a symbol in the image scene, the system comprising means for deriving a symbol meaning from the symbol, and means for communicating the symbol meaning to the vehicle user.

The information indicator may be comprised in a road sign in the image scene. Alternatively, or in addition, the information indicator may be comprised in an advertisement board in the image scene.

The system may comprise location indicator means for determining a geographical location of a vehicle and wherein the means for outputting the country language signal derives the country language signal from the location indicator means.

The image processing means may comprise means for generating multiple information outputs, wherein each of the information outputs represents text and/or a symbol in a different region of the image scene. In this way the user may have the option to be presented with multiple pieces of information relating to different regions of a road sign, or relating to consecutive road signs along the road side.

In this embodiment, it is beneficial for the system to comprise user selection means for enabling user selection of a region of the image scene from which information is required.

In another implementation, the multiple information outputs may be communicated to the user in the order in which the vehicle passes the corresponding different region in the image scene.

In one embodiment the communication means may be arranged to communicate the information output to the vehicle user in a manner that is dependent on the position of the information indicator in the image scene.

The system may include an audio system having multiple speakers each in a different position in the vehicle. If multiple information outputs are generated, each of the information outputs may be communicated through a different one of the speakers according to the position of the speaker in the vehicle and the position of the information indicator in the image scene. This provides the driver with a particularly convenient position-dependent presentation of the information in the image scene with minimal effort required on their part to obtain the information. In particular, the driver is advised in a particularly clear manner if the information outputs are communicated in dependence on the relative position of the corresponding information indicator in the image scene with respect to the driver.

The communication means may include an audio system and/or a visual display screen.

The system may comprise means for enabling user selection of the visual display screen or the audio system as the means of communication.

According to another aspect of the invention, there is provided a method for use in a vehicle having a selected vehicle language in which communications are to be carried out between a vehicle user and the system, the method comprising capturing an image scene external to the vehicle, wherein the image scene includes one or more information indicator including text in a country language other than the selected vehicle language; outputting a vehicle language signal representative of the selected vehicle language to an off-board server; outputting a country language signal to the off-board server which is representative of the country language; outputting the text to the off-board server for translation from the country language into the vehicle language; receiving a translated text output from the off-board server which is representative of the translated text; and communicating the translated text output to the vehicle user.

According to another aspect, there is provided a method for use in a vehicle having a selected vehicle language in which communications are to be carried out between a vehicle user and the system, the method comprising capturing an image scene external to the vehicle, wherein the image scene includes one or more information indicator including text in a country language other than the selected vehicle language; translating the text from the country language into the selected vehicle language and for generating a translated text output representative of the translated text; and communicating the translated text output to the vehicle user.

According to another aspect, the invention relates to a vehicle comprising a system as set out in any of the aforementioned statements.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

Embodiments of the present invention will now be described, by way of example only, with reference to the following figures in which.

DETAILED DESCRIPTION

Figure 1:
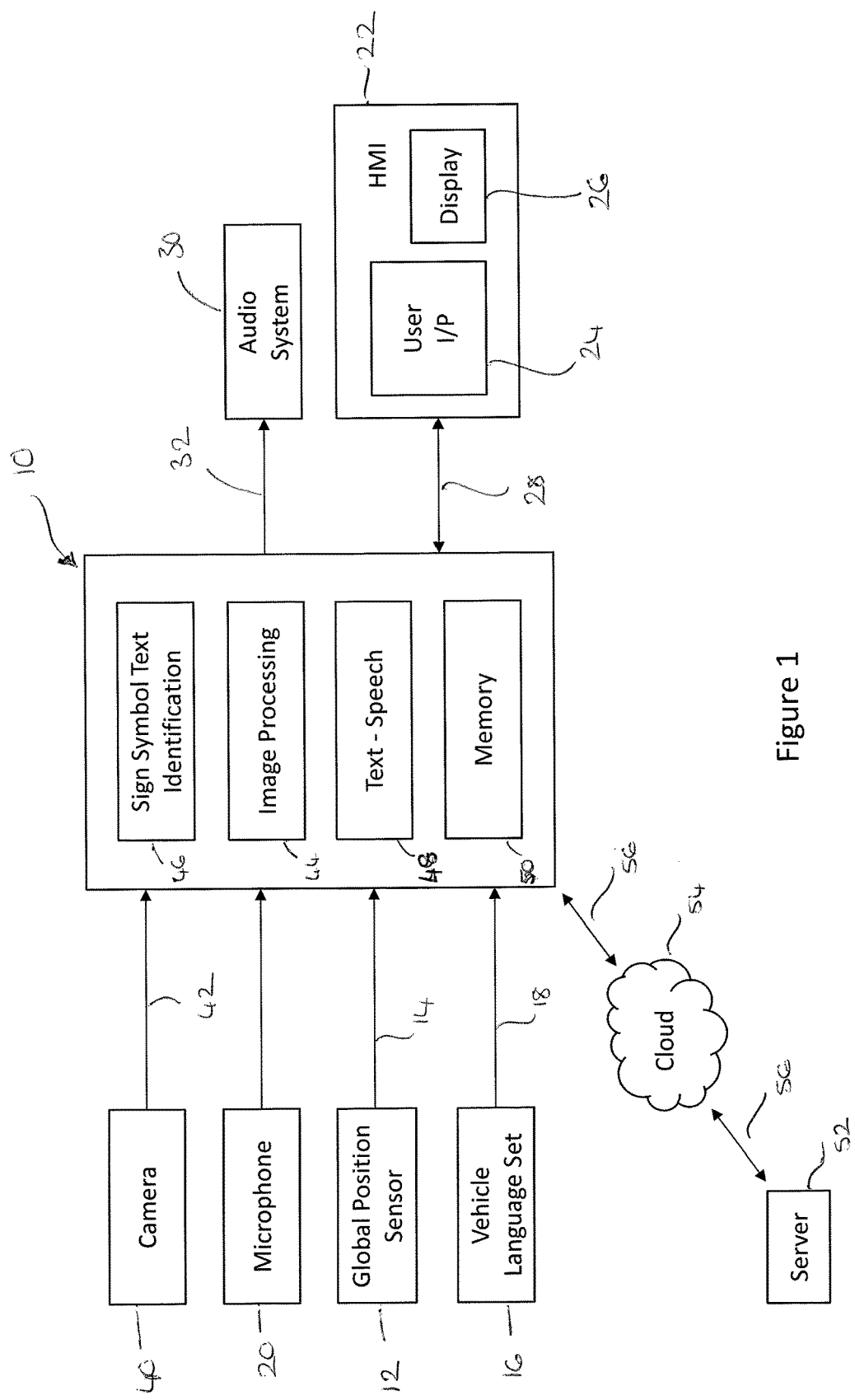
FIG. 1 shows a schematic diagram of a vehicle system in accordance with a first embodiment of the invention, including a vehicle camera system for capturing an image scene.

A vehicle typically includes an on-board vehicle computer system 10 which controls various vehicle settings either automatically in response to sensor outputs from various vehicle sensors or in response to user-initiated commands. Forming part of the vehicle computer system 10 is an infotainment system which enables audio and visual in-vehicle entertainment services to be provided to the vehicle user via in-vehicle radio and television systems (not shown), respectively. The infotainment system also includes a satellite navigation system (not shown).

The vehicle is fitted with a location indicator means in the form of a global position sensor 12 which establishes an indication of the current vehicle position through communication with an external positioning system (not shown). The global position sensor 12 provides an output signal 14 to the computer system 10 to provide an indication of the vehicle's position to the computer. The output signal 14 is also used in particular as an input to the satellite navigation system.

The on-board computer system 10 may consist solely of hardware carried on the vehicle, and forming an integral part of the vehicle at the time of purchase, or may in part or in full be provided by a device that is carried on-board the vehicle, such as the driver's personal device (e.g. a tablet or mobile phone), which is also used for other purposes off-board the vehicle. With this in mind, the invention may be embodied in an application running on a vehicle user's personal mobile device.

The computer system 10 derives a corresponding country indicator signal from the position signal to provide an indication of the country in which the vehicle is travelling. The country indicator signal may be derived from a look-up table stored on the computer system 10.

If the computer system is embodied in part or in full within the mobile device carried by the user within the vehicle, the mobile device may be used to generate the country signal. A mobile device typically communicates with a mobile network operator, so as to enable a determination of which cell of the local area network the vehicle is travelling in.

The language of the vehicle is set via a vehicle language set function 16 at the time the vehicle is purchased, and corresponds to the language in which the user wishes to communicate with the HMI. A vehicle language signal 18 is provided to the computer system 10 from the vehicle language set function 16. The vehicle also includes a microphone 20 to allow a vehicle user to issue voice commands to the computer system 10, or to allow interaction with the user's telephone when operating through the computer system via a wireless connection (e.g. Bluetooth®).

The vehicle also includes a human machine interface (HMI) 22 via which the driver can enter or control various vehicle settings, such as the inputs to the infotainment system and including inputs to the satellite navigation system. For this purpose the HMI is provided with a user input interface 24. The HMI 22 also includes a display means, typically in the form of an LCD display screen 26, for displaying information to the vehicle driver about the various vehicle settings or attributes. The HMI communicates with the vehicle computer via output signals 28. The vehicle also includes an audio system 30 which is responsive to a control output signal 32 from the vehicle computer.

The language of the vehicle is set at the time the vehicle is purchased, and corresponds to the language in which the user wishes to communicate with the HMI (for example, English, German, French). The language signal 18 is input to the vehicle computer system 10 so that communications, such as instructions and other prompts, are output to the driver in the correct language via the HMI display 26 and/or the audio system 30, as will be described in further detail later.

The front of the vehicle is fitted with a camera system 40 for capturing image data from an image scene as the vehicle travels on a journey. The camera system 40 provides image scene data to the computer system via output signals 42. The computer system 10 includes a processor means for processing the image data captured by the camera system. For the purpose of processing image data the computer system includes an image processor 44, a sign-symbol-text (SST) identification processor 46 and a text-to-speech (TTS) processor 48.

The computer system 10 also includes a data store or memory 50 in which data provided to the computer system 10 may be stored, temporarily or permanently.

The on-board computer system communicates with an external server 52 via an internet service provider 54 in a conventional manner via a wireless connection 56.

If the vehicle is being driven in a country or territory where the language is not the same as the selected language of the vehicle, as indicated by the vehicle language signal 18, the system is operable to capture image data from road signs carrying text in the foreign language, and to enable translation of text in the image data. The system is further operable to enable interpretation of symbols carried by the road signs, which symbols may be unfamiliar to the driver especially travelling in a country other than his own country. The translation of the text and the interpretation of the symbols can be communicated to the driver to aid safe and convenient driving.

Figure 2:
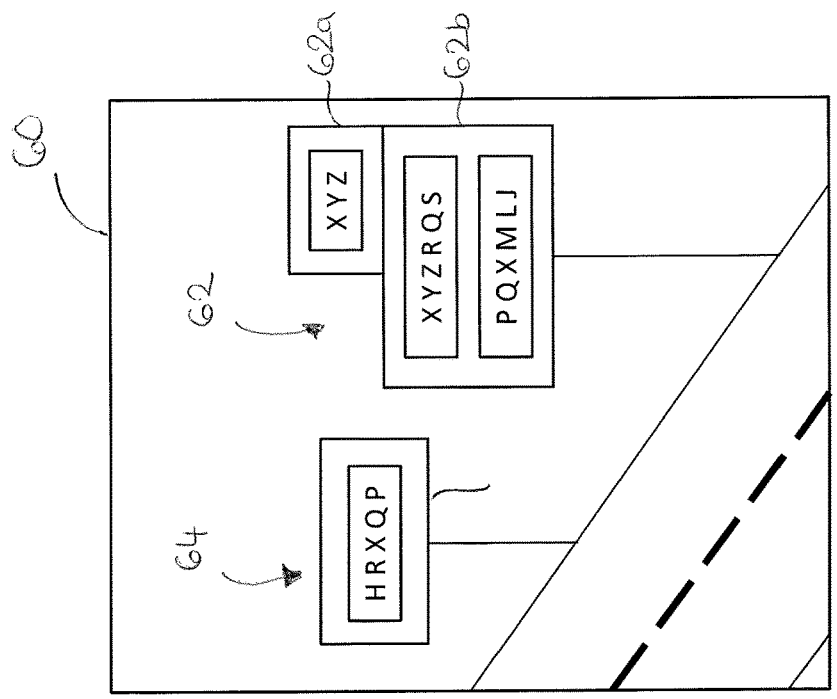
FIG. 2 is an example of an image scene which may be captured by the vehicle camera system in FIG. 1 as the vehicle travels on its journey.

Referring to FIG. 2, there is shown an example of an image scene 60 which may be captured by the vehicle camera system 40 as the vehicle travels on its journey. The image scene 60 including first and second road signs 62, 64, the first road sign 62 consisting of first and second sign regions 62a, 62b each carrying text and the second road sign 64 consisting of a single region of text. The text on the road signs 62, 64 may, for example, relate to a place name or tourist attraction, a direction, or an exit on the road being travelled. The camera system 40 captures the image data from the scene and outputs the image data to the image processor 44. The image processor 44 processes the data and supplies this to the SST processor 46. The SST processor 46 determines whether a sign is present in the image scene. If a sign is identified, image data relating to the sign element of the image undergoes a symbol identification step, to determine whether a symbol is present on the sign. The image data also undergoes a text identification step, to determine whether there is text present on the sign. In the example of FIG. 2, there is no symbol to identify on either of the road signs 62, 64, only text.

For the road sign indicated in FIG. 2, the text on the first and second sign regions 62a, 62b of the first road sign 62, and the text on the second road sign 64, is extracted from the image data for translation purposes. In the data store 50, the text indications are assigned with the respective positions in the image scene at which the road signs 62, 64 appear. The numerical assignations for the different regions of the signs are useful for presentation purposes, as will become clear from the following description.

The text indications are output to the external server 52 together with a country indicator signal (not shown) corresponding to vehicle location, as derived from the global position sensor 12, which identifies the country in which the vehicle is travelling. The country indicator signal provides an indication of the language of the text on the road signs 62, 64. The country indicator signal is transmitted, via wireless communication, to a text translation processor stored on the external server 52. The vehicle language signal 18 which is received by the computer system 10 is also transmitted to the external server 52 via wireless communication. The external server 52 therefore receives data corresponding to the text in the road signs in the image scene, a country indicator signal and a vehicle language signal.

The text received at the external server 52 is translated by the text translation processor on the external server 52 where it is converted from the country language 9 (as indicated by the country indicator signal) into the vehicle language (as indicated by the vehicle language signal). Data corresponding to the translated text is communicated back to the computer system 10 via wireless communication. The data corresponding to the translated text is input to the TTS processor 48 on the on-board computer where it is converted into a text signal compatible with the audio system 30 to enable an audible presentation of the translated text to the driver through speakers of the audio system. The translated text is also converted into a text signal which is compatible with the HMI display 22 so that the translated text can be presented to the driver visually. The HMI display 26 presents to the driver a selection screen to allow him to select, via the user input means 24, whether to hear announcements relating to the road sign information audibly, or to be presented with a visual display of information, or whether to be presented with both.

Data corresponding to the translated text is stored in the data memory 50 on the computer system so that it can be accessed at a later date, if required. The translated text data is stored in combination with the image scene data so that the driver can select from previous image scenes captured by the camera system 50 to retrieve the required text information, as described in further detail below.

For a visual presentation of the translation, each area of text in the road signs 62, 64 may be assigned a different number indication in the data store 50. The user is then presented on the display screen 26 with a look-up table showing which number indication corresponds to which region of text in the road signs 62, 64. For example, the first region 62a of the first road sign 62 may be assigned number 1, the second region 62b of the first road sign 62 may be assigned number 2 and the second road sign 64 may be assigned number 3. The selection screen includes a list of three text translations corresponding to 1, 2 and 3, to allow the driver to correlate the road signs in the image with the appropriate translated text.

As an alternative, or in addition, the driver may be provided with an audible announcement of the text translation in response to making a selection of the particular region of the sign that he is interested in. For example, the driver may select to hear an audible announcement relating to the first region 62a of the first road sign 62 by selecting number 1, or may select to hear an announcement relating to the second road sign 64 by selecting number 3.

In a variation to the aforementioned embodiment, the driver may be presented with announcements corresponding to the translated text in the order in which the vehicle passes the road signs 62, 64. In this case the driver will simply hear announcements on his journey as he passes a road sign with text on it, without the need to make a selection.

The system may also be configured to allow the driver to retrieve information from the data memory 50 relating to a road sign that has been passed previously. In order to do this, the driver selects an option on the HMI display 26 to request previous road sign information. He is then presented with a series of previous images from which he can select, using the user input means 24, a previous road sign for which a translation of the text is required. The selected translation is retrieved from the data memory 50 and presented to the driver, either audibly or visually, in accordance with his selected preference.

Figure 3:
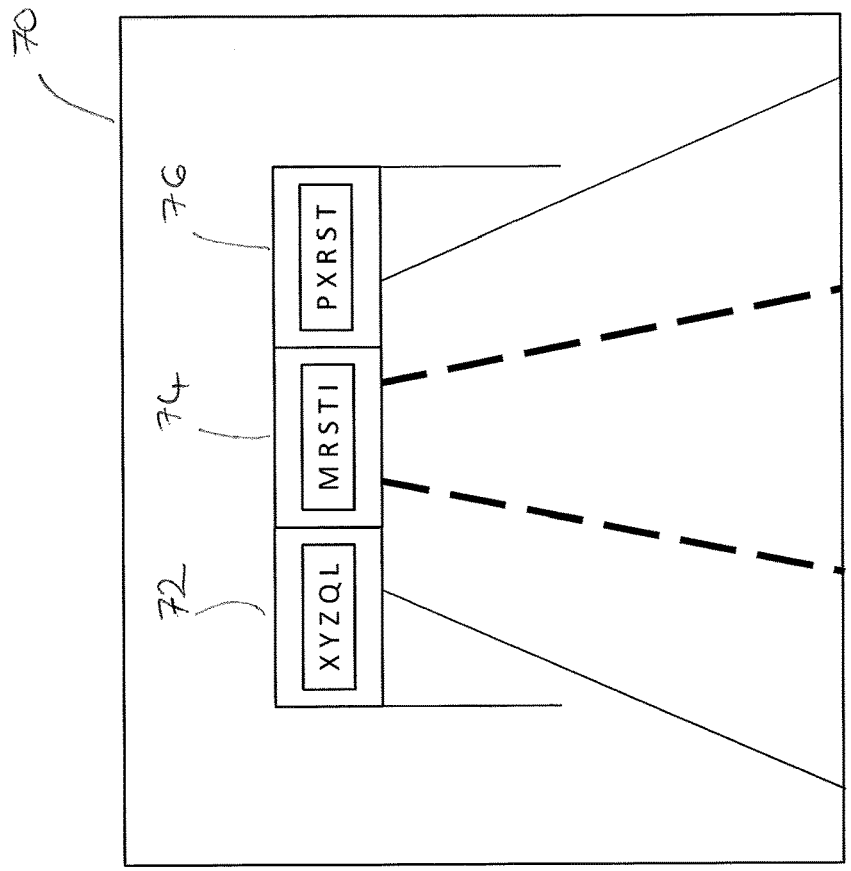
FIG. 3 is an example of an alternative image scene which may be captured by the vehicle camera system in FIG. 1 as the vehicle travels on its journey.

In another embodiment the system may be configured to operate in combination with the audio system to provide announcements to the driver in dependence on the position of the road sign in the image scene 70. Referring to FIG. 3, a vehicle journey may include travelling along a three-lane highway or motorway, with first, second and third overhead road signs 72, 74, 76, respectively, one above each of the three lanes.

The audio system 30 includes multiple speakers (not shown) arranged at different locations in the vehicle. Typically, for example, the audio system 30 may include a left hand front speaker, a left hand rear speaker, a right hand front speaker, a right hand rear speaker and a centre front speaker. As before, the camera system 40 captures the image scene 70 including the three overhead road signs 72, 74, 76. The data relating to the text in the road signs is output to the external server 52 for translation, together with the vehicle language signal and the country output signal. The text is translated at the external server 52 and data corresponding to the translated text is transmitted back to the computer system 10. The data corresponding to the translated text is input to the TTS processor 48 where it is converted into a text output signal compatible with the audio system, to enable an audible presentation of the translated text to the driver.

A positional indication for each road sign 72, 74, 76 is assigned to the associated text data in the data memory 50 to indicate the position of the road sign in the image scene 70. The computer system then outputs the text signals to the audio system 30 depending on the position of the text in the image scene 70. For example, the text output signal corresponding to the text of the road sign 72 above the left hand lane is output to the left hand front speaker, the text output signal corresponding to the text of the road sign 76 above the right hand lane is output to the right hand front speaker, and the text output signal corresponding to the text of the road sign 74 above the centre lane is output to the front centre speaker. The audible outputs are delivered in sequence, through one speaker at a time. The speaker through which the announcement is heard indicates to the driver which part of the image scene 70 the text is drawn from (i.e. left, right or centre).

The data corresponding to the translated text is also converted in the image processor 44 to a text output signal compatible with the HMI display 26. In the data memory, text data relating to the left hand road sign 72 is stored and assigned number 1, text data relating to the centre road sign 74 is stored and assigned number 2 and the text data relating to the right hand road sign 76 is stored and assigned number 3, as described previously. The driver is presented with a visual display of the image scene on the HMI display 26, together with the number indications 1, 2 and 3. A list of the number indications, together with the corresponding text translation, is also presented on the display 26 to allow the driver to select the road sign 72, 74 or 76 for which a repeat translation is required. The driver may select to repeat the audible announcement of the text translation or may select to be presented with the text translation visually.

In another embodiment of the invention, the system need not require any translation aspect but may be used simply to enable a driver to be presented with the text in the language of the road sign, either visually or audibly, as a reminder of a road sign that has been passed previously. This may be useful when the driver fails to read or understand fully the content of a road sign as he drives past. The camera system 40 captures image data as before and transmits the data to the computer system 10. If the global position sensor 12 indicates that the vehicle is travelling in the home country, so that there is no language issue, there is no need for the data to be transmitted to the external server 52 for translation purposes. Instead, the data is converted in the TTS processor 48 to provide a text output signal which may be output to the audio system 30. The data is also converted in the image processor 44 to provide a text output signal which is compatible with the HMI display 26. The driver is presented with an image scene on the HMI display 26, with number indications being attributed to each region of text, as described previously, to enable selection of the text for which translation is required. The translation may then be presented audibly or visually, depending on driver selection.

Figure 4:
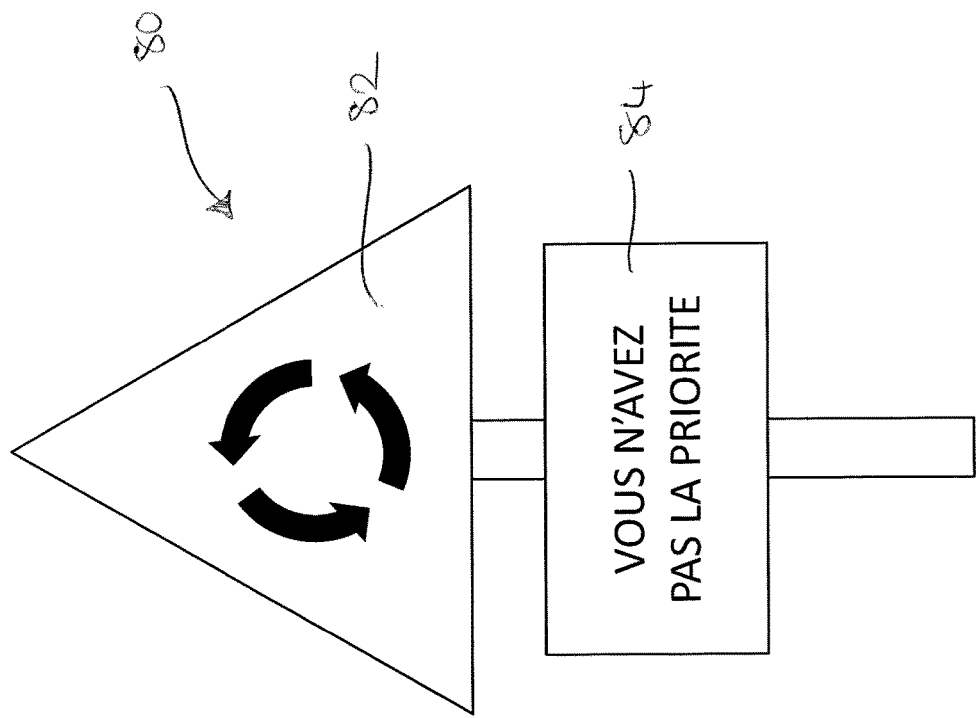
FIG. 4 is an example of a road sign which may be captured in an image scene, the road sign including both text and symbol information.

FIG. 4 shows an example of a road sign 80 which may be encountered on a French road and captured in the image scene. The camera system 40 captures an image of the scene and transmits image data to the computer system 10 for processing. The road sign 80 includes a symbol 82 as well as text 84. As before, image data is processed by the SST identification processor 46 to identify that the road sign 80 appears in the image scene. The SST identification processor 46 is also operable to identify and extract data relating to the symbol 82 from the image data. The symbol is then interpreted, so that the meaning of the symbol can be presented to the driver. This is particularly useful when the driver is travelling in a country other than his home country, where road symbols are unfamiliar to him.

Figure 5:
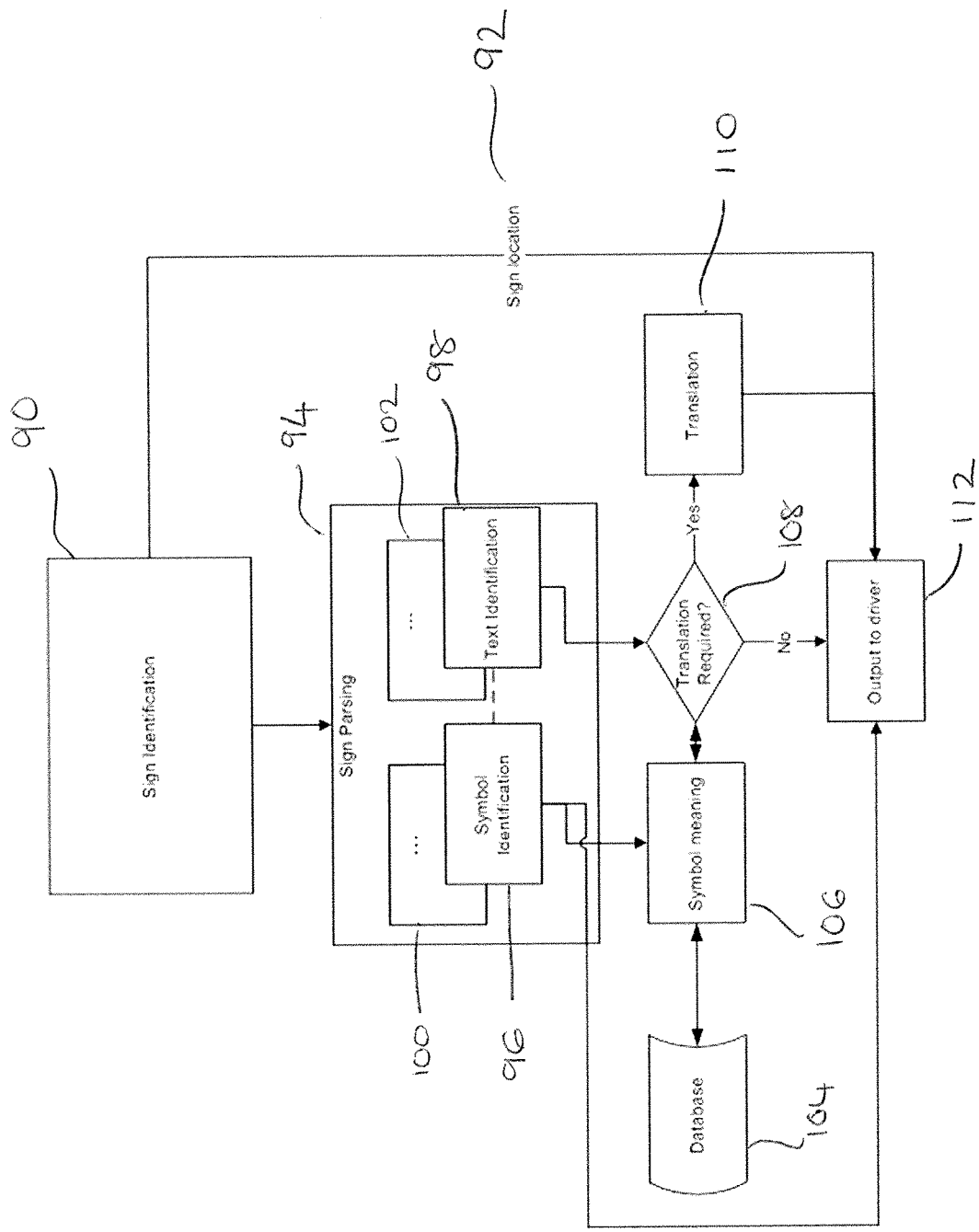
FIG. 5 is a flow diagram to illustrate the steps of a method of extracting symbol and text information from a road sign in an image scene captured by the vehicle camera system.

FIG. 5 illustrates a flow diagram to show in further detail how the computer system 10 operates to discern meaning from a road sign 80 which incorporates both a symbol indication 82 and a text indication 84. At the sign identification step 90, the SST identification processor 46 determines that a road sign 80 is present in the image scene. The GPS sensor also provides an indication 92 to the HMI display (or to the audio system) regarding the geographical location of the road sign 80.

In a subsequent sign parsing step 94, the system performs a symbol identification check 96 for symbols and a text identification step 98 for text on the sign which has been identified in the scene. The SST identification processor 46 extracts symbol data and text data from the image data, as appropriate. For the road sign 80 in FIG. 4, there is only one symbol 82 and one text indication 84 to be identified, but for other road signs there may be additional symbols or text indications (as represented by the additional blocks 100 and 102). Where multiple symbols and/or text are identified, each is extracted from the data to provide an independent and separate data set for the next stage of the process.

The next stage of the process is to determine at step 108 whether translation of the symbol meaning or of the text meaning is required. If the country indicator signal indicates that the vehicle is being driven in a country where the language is not the same as the selected language of the vehicle, translation of the text indication is required.

If translation of the text indication is required, the computer system (or mobile device) also transmits the country indicator signal to the external server 52, on the basis of the global position sensor output, to indicate the country that the vehicle is travelling in (in this example, France).

In order to communicate to the user the meaning of the symbol identified in the road sign, the external server 52 carries a data memory or database 104 relating road sign symbols to their meaning for various different countries. The external server 52 looks up the meaning of the symbol in a data memory 104 which corresponds to the appropriate country (as determined from the country indicator signal) and transmits a data signal representing the symbol meaning 106 back to the computer system 10. If it has been determined at step 108 that translation of the symbol meaning is required into the selected vehicle language (i.e. because it differs from the language of the country in which the vehicle is travelling), the translation step is done at the remote server 52 prior to data relating to the meaning being transmitted back to the vehicle.

The translated output is then presented to the driver at step 112 once the TTS processor 48 has processed the symbol meaning to provide a symbol output signal that is compatible with the audio system 30. The driver therefore hears a translated audible presentation of the meaning of the symbol.

In a similar manner as for the data relating to the symbol 82, data relating to the text 84 is extracted from the image scene at step 98 (and including step 102 if there are multiple regions of text). If it is determined that the language of the country in which the vehicle is travelling is not the same as the selected language of the vehicle, the text data is transmitted to the external server 52 via wireless communication and translation of the text meaning is carried out at step 110 at the remote server 52. If the vehicle is being driven in a country where the language is the same as the selected language of the vehicle, no translation of the text indication is required and the text can simply be communicated to the driver audibly corresponding to the text in the form in which it appears on the road sign.

If translation is required, text data is transmitted to the external server 52 together with the vehicle language signal and the country indicator signal. The external server 52 looks up the data memory and provides a data signal corresponding to the translated version of the text to the computer system 10, as described previously.

If the country language signal indicates that the country in which the vehicle is travelling has more than one language, a determination is made at the external server 52 regarding which language the text is to be translated from. Alternatively, the driver may be presented with a list from which the country language can be selected for subsequent translation into the vehicle language at the external server 52.

As before, at step 112 the driver may select to hear an audible announcement of the translated text via the audio system 30 or to view a visual indication of the translated text on the HMI display 26, or he may select both options. The driver is presented with a selection screen on the HMI display 26 to enable him to select his preferred presentation method. Selection of the preferred presentation type is made via the user input device 24.

Figure 6:
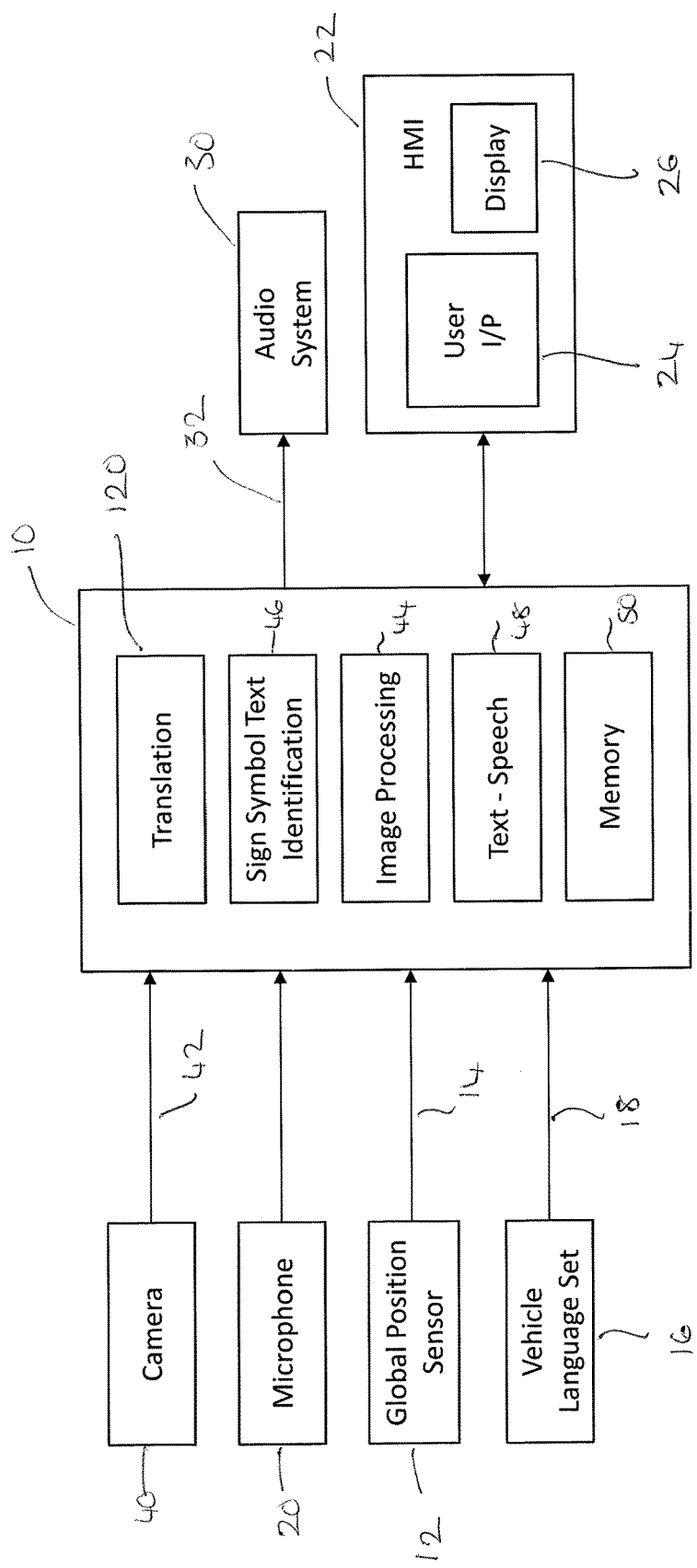
FIG. 6 shows a schematic diagram of a vehicle system in accordance with an alternative embodiment of the invention to that shown in FIG. 1.

Referring to FIG. 6, in another embodiment the computer system 10 need not rely on an external server 52 for the translation stages of the process, but instead may be provided with an on-board translation processor 120. In this case, data corresponding to text in the image scene is provided to the translation processor 120 together with the country indicator signal and the vehicle language signal. The translation processor 120 translates the text into the vehicle language and outputs the appropriate text output signal to the audio system 30, if audible presentation is selected by the driver. Alternatively, an appropriate text signal is output to the HMI display for visual presentation of the translated text to the driver, if the driver has selected to view the translation visually. A benefit of this embodiment is that any wireless communication 'black spots' which may exist when the vehicle is communicating with the external server 52 in FIG. 1 do not result in a delay in translated information being communicated to the driver.

Without communication with the external server 52 in FIG. 1, the computer system also stores, in the data memory, look-up tables relating sign symbol information to meaning for various countries in the world in which the vehicle may be driven. When the camera system returns image data to the computer system 10, including data relating to text in a road sign in the image scene, the data is input to the memory 50, together with the corresponding country indicator signal, so that the corresponding meaning can be extracted from the relevant look-up table. The meaning is then either converted in the TTS processor 48 to provide an appropriate text output signal to the audio system 30 and/or an appropriate text output signal is provided to the HMI display 26, in the vehicle language, depending on the preference selected by the driver.

In another embodiment, the system may be configured to allow off-board as well as on-board text translation and symbol interpretation steps. For example, if the vehicle is travelling in a 'black spot' where wireless communication with the external server is lost, or provides only slow communication of data, the system may be configured to rely on the on-board text translation and symbol interpretation functions.

Other applications are envisaged where the invention provides benefit, other than the translation and interpretation of road signs. For example, the camera system on the vehicle may capture image data from billboards or advertisements, so that the system may provide the vehicle driver with a translation or interpretation of a whole host of other useful information which appears on such hoardings, such as information about places of interest, restaurants, shops and service facilities.

It will be appreciated by a person skilled in the art that the invention could be modified to take many alternative forms without departing from the scope of the appended claims.

Further aspects of the present invention are set out in the following numbered Clauses:

Clause 1. A system for use in a vehicle having a selected vehicle language in which communications are to be carried out between a vehicle user and the system, the system comprising an image capture device for capturing an image scene external to the vehicle, wherein the image scene includes one or more information indicator including text in a country language other than the selected vehicle language; a device for outputting a vehicle language signal representative of the selected vehicle language to an off-board server; a device for outputting a country language signal to the off-board server which is representative of the country language; a device for outputting the text to the off-board server for translation from the country language into the vehicle language; a translator for receiving a translated text output from the off-board server which is representative of the translated text; and a communication device for communicating the translated text output to the vehicle user.

Clause 2. A system for use in a vehicle having a selected vehicle language in which communications are to be carried out between a vehicle user and the system, the system comprising an image capture device for capturing an image scene external to the vehicle, wherein the image scene includes one or more information indicator including text in a country language other than the selected vehicle language; a translation device for translating the text from the country language into the selected vehicle language and for generating a translated text output representative of the translated text; and a communication device for communicating the translated text output to the vehicle user.

Clause 3. A system according to Clause 1, wherein the information indicator also includes a symbol, the system comprising a processor for deriving a symbol meaning from the symbol, and wherein the communication device communicates the symbol meaning to the vehicle user.

Clause 4. A system according to Clause 1, wherein the information indicator is comprised in a road sign in the image scene.

Clause 5. A system according to Clause 1, wherein the information indicator is comprised in an advertisement board in the image scene.

Clause 6. A system according to Clause 1, comprising a location indicator for determining a geographical location of a vehicle and wherein the output device derives the country language signal from the location indicator.

Clause 7. A system according to Clause 1, wherein the image processor comprises an outputting device for generating multiple information outputs, wherein each of the information outputs represents text and/or a symbol in a different region of the image scene.

Clause 8. A system according to Clause 7, including a user selection device for enabling user selection of a region of the image scene from which information is required.

Clause 9. A system according to Clause 7, wherein the outputting device is configured so as to communicate the multiple information outputs to the user in the order in which the vehicle passes the corresponding different region in the image scene.

Clause 10. A system according to Clause 1, wherein the communication device is configured to communicate the information output to the vehicle user in a manner dependent on the position of the information indicator in the image scene.

Clause 11. A system according to Clause 10, including an audio system having multiple speakers each in a different position in the vehicle, and wherein the or each information output is communicated through a speaker according to the position of the speaker in the vehicle and the position of the information indicator in the image scene.

Clause 12. A system according to Clause 1, wherein the communication device includes an audio system.

Clause 13. A system according to Clause 1, wherein the communication device includes a visual display screen.

Clause 14. A system according to Clause 12, further comprising a selection device for enabling user selection of the type of communication device.

Clause 15. A method for use in a vehicle having a selected vehicle language in which communications are to be carried out between a vehicle user and the system, the method comprising; capturing an image scene external to the vehicle, wherein the image scene includes one or more information indicator including text in a country language other than the selected vehicle language; outputting a vehicle language signal representative of the selected vehicle language to an off-board server; outputting a country language signal to the off-board server which is representative of the country language; outputting the text to the off-board server for translation from the country language into the vehicle language; receiving a translated text output from the off-board server which is representative of the translated text; and communicating the translated text output to the vehicle user.

Clause 16. A method for use in a vehicle having a selected vehicle language in which communications are to be carried out between a vehicle user and the system, the method comprising capturing an image scene external to the vehicle, wherein the image scene includes one or more information indicator including text in a country language other than the selected vehicle language; translating the text from the country language into the selected vehicle language and for generating a translated text output representative of the translated text; and communicating the translated text output to the vehicle user.

Clause 17. A vehicle comprising the system according to Clause 1.

The invention claimed is:

1. A system for use in a vehicle having a selected vehicle language in which communications are to be carried out between a vehicle user and the system, the system comprising:
   a camera system that captures an image scene external to the vehicle, wherein the image scene includes one or more information indicators including text in a country language other than the selected vehicle language; and
   a computer system in communication with the camera system, wherein the computer system performs the following:
      outputs a vehicle language signal representative of the selected vehicle language to an off-board server;
      outputs a country language signal to the off-board server which is representative of the country language;
      outputs the text to the off-board server for translation from the country language into the vehicle language;
      receives a translated text output from the off-board server which is representative of the translated text; and
      communicates the translated text output to the vehicle user;
   wherein the camera system generates multiple information outputs from the image scene, wherein each of the multiple information outputs represents the translated text corresponding to an information indicator in a different region of the image scene; and
   wherein the camera system communicates the multiple information outputs to the vehicle user so as to identify which information indicator corresponds to which region of the image scene in an order in which the vehicle passes a corresponding different region in the image scene.

2. A system for use in a vehicle having a selected vehicle language in which communications are to be carried out between a vehicle user and the system, the system comprising:
   a camera system that captures an image scene external to the vehicle, wherein the image scene includes one or more information indicators including text in a country language other than the selected vehicle language;
   a processor that translates the text from the country language into the selected vehicle language, generates a translated text output representative of the translated text, and communicates the translated text output to the vehicle user;
   wherein the camera system generates multiple information outputs from the image scene, wherein each of the multiple information outputs represents the translated text corresponding to an information indicator in a different region of the image scene and
   wherein the camera system communicates the multiple information outputs to the vehicle user so as to identify which information indicator corresponds to which region of the image scene in an order in which the vehicle passes a corresponding different region in the image scene.

3. The system of claim 1, wherein the information indicator also includes a symbol, and wherein the computer system derives a symbol meaning from the symbol and communicates the symbol meaning to the vehicle user.

4. The system of claim 1, wherein the information indicator is comprised in a road sign in the image scene.

5. The system of claim 1, wherein the information indicator is comprised in an advertisement board in the image scene.

6. The system of claim 1, further comprising a global position sensor that determines a geographical location of the vehicle, and wherein the computer system derives the country language signal from the global position sensor.

7. The system of claim 1, further comprising a display that allows user selection of a region of the image scene from which the information output is to be derived.

8. The system of claim 1, wherein the computer system communicates the translated text output to the vehicle user in a manner dependent on a position of the information indicator in the image scene.

9. The system of claim 8, further comprising an audio system having multiple speakers each in a different position in the vehicle, and wherein the translated text output to the vehicle user is communicated through a speaker according to the respective position of the speaker in the vehicle and the position of the information indicator in the image scene.

10. The system of claim 1, wherein the computer system comprises an audio system.

11. The system of claim 1, wherein the computer system comprises a visual display screen.

12. The system of claim 10, further comprising an interface that allows user selection of a type of communication.

13. A method for use in a vehicle having a selected vehicle language, the method comprising:
   capturing an image scene external to the vehicle, wherein the image scene includes one or more information indicators including text in a country language other than the selected vehicle language;
   outputting a vehicle language signal representative of the selected vehicle language to an off-board server;
   outputting a country language signal to the off-board server which is representative of the country language;
   outputting the text to the off-board server for translation from the country language into the vehicle language;
   receiving a translated text output from the off-board server which is representative of the translated text;
   generating multiple information outputs from the image scene, wherein each of the multiple information outputs represents the translated text corresponding to an information indicator in a different region of the image scene; and
   communicating the multiple information outputs to the vehicle user so as to identify which information indicator corresponds to which region of the image scene in an order in which the vehicle passes a corresponding different region in the image scene so as to communicate the translated text output to a vehicle user.

14. A method for use in a vehicle having a selected vehicle language, the method comprising:
   capturing an image scene external to the vehicle, wherein the image scene includes one or more information indicators including text in a country language other than the selected vehicle language;
   translating the text from the country language into the selected vehicle language and generating a translated text output representative of the translated text;
   generating multiple information outputs from the image scene, wherein each of the multiple information outputs represents the translated text corresponding to an information indicator in a different region of the image scene; and
   communicating the multiple information outputs to the vehicle user so as to identify which information indicator corresponds to which region of the image scene in an order in which the vehicle passes a corresponding different region in the image scene so as to communicate the translated text output to a vehicle user.

15. A vehicle comprising the system of claim 1.

16. A vehicle comprising the system of claim 2.

* * * * *

UNITED STATES PATENT AND TRADEMARK OFFICE
CERTIFICATE OF CORRECTION

Page 1 of 1

PATENT NO. : 9,971,768 B2
APPLICATION NO. : 15/114663
DATED : May 15, 2018
INVENTOR(S) : Murthy et al.

It is certified that error appears in the above-identified patent and that said Letters Patent is hereby corrected as shown below:

On the Title Page

Item (56) Insert:
-- 2004/0093220 A1*  5/2004  Kirby ............... G06F 17/27 704/278
2015/0217691 A1*  8/2015  Tanuki ............. E02F 9/261 348/148
2005/0010412 A1*  1/2005  Aronowitz ......... G10L 15/02 704/254 --

Signed and Sealed this
Fourth Day of December, 2018

Andrei Iancu
*Director of the United States Patent and Trademark Office*